United States Patent
Yellin et al.

(10) Patent No.: US 10,667,235 B1
(45) Date of Patent: May 26, 2020

(54) SERVER AND PLURALITY OF ACCESS POINTS FOR LOCATING AND IDENTIFYING A MOBILE DEVICE

(71) Applicants: Eric Yellin, Boca Raton, FL (US); Jordyn Hollander, Boca Raton, FL (US)

(72) Inventors: Eric Yellin, Boca Raton, FL (US); Jordyn Hollander, Boca Raton, FL (US)

( * ) Notice: Subject to any disclaimer, the term of this patent is extended or adjusted under 35 U.S.C. 154(b) by 0 days.

(21) Appl. No.: 16/361,730

(22) Filed: Mar. 22, 2019

(51) Int. Cl.
| | | |
|---|---|---|
| *H04W 64/00* | (2009.01) | |
| *G01S 5/14* | (2006.01) | |
| *G01S 11/06* | (2006.01) | |
| *H04W 4/33* | (2018.01) | |
| *H04W 4/02* | (2018.01) | |

(Continued)

(52) U.S. Cl.
CPC .............. *H04W 64/00* (2013.01); *G01S 5/14* (2013.01); *G01S 11/06* (2013.01); *H04W 4/023* (2013.01); *H04W 4/025* (2013.01); *H04W 4/029* (2018.02); *H04W 4/33* (2018.02); *H04W 88/02* (2013.01); *H04W 88/08* (2013.01)

(58) Field of Classification Search
CPC ....... H04W 64/00; H04W 4/33; H04W 16/20; H04W 16/225; H04W 64/003; H04W 64/006; H04W 88/00; H04W 8/02; H04W 88/08; H04W 88/12; H04W 92/10; H04W 4/04; H04W 4/029; H04W 4/027; H04W 4/38; H04W 4/50; H04W 4/70; H04W 4/80; H04W 4/90; H04W 4/02; H04W 4/00; H04W 4/23; H04W 4/024; H04W 4/025; H04W 4/026; H04W 12/00503; H04W 4/023; H04W 40/38; G01S 11/06; G01S 5/14; G01S 2201/025; G01S 5/0009; G01S 5/145; G01S 5/30; G01S 5/22; G01S 5/20; G01S 2013/466; G01S 13/50; G01S 2015/465; G01S 7/415; G01S 7/411; G01S 7/412; G01S 2013/468; G01S 13/48; G01S 1/00; G01S 1/02; G01S 5/00; G01S 5/02; G01S 19/25; G01S 19/252; G01S 5/0284; G01S 15/50; G01S 15/30

See application file for complete search history.

(56) References Cited

U.S. PATENT DOCUMENTS

| | | | |
|---|---|---|---|
| 10,327,107 B2 * | 6/2019 | Rehman et al. ...... | H04W 4/029 |
| 2006/0084452 A1 * | 4/2006 | Momosaki et al. ......... | 455/466 |

(Continued)

*Primary Examiner* — Meless N Zewdu
(74) *Attorney, Agent, or Firm* — The Rapacke Law Group, P.A.

(57) ABSTRACT

A system for locating and identifying a mobile device in an environment comprising a plurality of access devices disposed in an environment is provided. Each access device detects a signal strength of a mobile device in relation to the plurality of access devices in addition to a media access control address to identify the mobile device. A trilateration processor computed a distance between the plurality of access devices and the mobile device, and a non-linear regression processor determines the second distance from a sum of errors received from the trilateral processor to establish a location of the mobile device. A wireless network is in communication with the plurality of access devices, the mobile device, and a server to associate the distance with the media access control address of the mobile device.

15 Claims, 6 Drawing Sheets

(51) Int. Cl.
*H04W 88/08* (2009.01)
*H04W 4/029* (2018.01)
*H04W 88/02* (2009.01)

(56) References Cited

U.S. PATENT DOCUMENTS

2010/0042361 A1\* 2/2010 Hadley et al. ................ 702/152
2014/0274114 A1\* 9/2014 Rowitch ................. H04W 4/04
2015/0215892 A1\* 7/2015 Teng ................... H04W 64/003
2016/0219550 A1\* 7/2016 Palanki ................. H04W 64/00

\* cited by examiner

SERVER AND PLURALITY OF ACCESS POINTS FOR LOCATING AND IDENTIFYING A MOBILE DEVICE

TECHNICAL FIELD

The embodiments generally relate to wireless communication networks and more specifically relate to location-based tracking of devices through wireless access points in an environment.

BACKGROUND

Location-based services have been implemented to identify and track devices and their users. The data is aggregated and utilized to control the features of the devices in the environment. Such systems may be deployed in an indoor environment, such as in a shopping mall or parking garage. However, in many indoor environments, standard global positioning systems (GPS's) are inoperable or too inaccurate to provide useful information to the location-based service.

Device location data is often gathered as a function of a mobile application. This requires the user to download the application on their device for location and event data to be received by the system. While effective, data can only be sourced from users who have downloaded the mobile application, resulting in a large number of devices whose data is inaccessible.

Known algorithms may be utilized to identify a device and associate the identified device with its location in real-time. The received signal strength indication (RSSI) can be utilized to determine a distance between a mobile device and a receiver using a nonlinear least square fitting equation.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

The embodiments disclosed herein provide a system for locating and identifying a mobile device in an environment comprising a plurality of access devices disposed in the environment. Each access device detects a signal strength of a mobile device in relation to the plurality of access devices in addition to a media access control address to identify the mobile device. A trilateration processor computes a distance between the plurality of access devices and the mobile device, and a non-linear regression processor determines the second distance from a sum of errors received from the trilateral processor to establish a location of the mobile device. A wireless network is in communication with the plurality of access devices, the mobile device, and a server to associate the distance with the media access control address of the mobile device.

The embodiments do not require a mobile application or software system to be utilized on the mobile device. Each access point can aggregate the associated mobile device data anonymously to determine the location and identity of the mobile device in the environment more accurately than a GPS. One skilled in the arts will appreciate that the aggregated data may be utilized in a variety of systems and processes which may benefit the mobile device user, third-party users, and organizations alike.

In one aspect, the plurality of access devices is comprised of a first access device to detect a first signal strength of a mobile device, a second access device to detect a second signal strength of the mobile device, and a third access device to detect a third signal strength of the mobile device.

In one aspect, the first signal strength, the second signal strength, and the third signal strength are transmitted to the server.

In one aspect, the server is in operable communication with a trilateration processor to determine a first location of the mobile device.

In one aspect, the server is further comprised of a linear regression processor to determine a second location of the mobile device.

In one aspect, the server determines the media access control address of the mobile device.

In another aspect, the media access control address is associated with the second location.

In one aspect, the mobile device transmits a data packet to the server via the wireless network. The data packet is associated with the media access control address and the second location of the mobile device.

In one aspect, the server collates the media access control, the second location, and the data packet of the mobile device and stores the collated data in a database.

In one aspect, each of the plurality of access points is dynamically positioned in the environment.

In one aspect, the server distributes information to the mobile device via the wireless network. The information may be associated with an event corresponding to the environment. The server may function to process a user event within the environment once the mobile device has been located and identified.

A method for identifying and locating a mobile device in an environment is disclosed, the method comprises the steps of first, detecting, via at least three access points, a signal strength, a media access control address, and a data packet corresponding to a mobile device in an environment. The signal strength, media access control address, and data packet are transmitted, via the at least three access points, to a server via the wireless network. A trilateration processor computes a first distance between the plurality of access devices and the mobile device, and transmits the first distance to a non-linear regression processor in operable communication with the server. The non-linear regression processor may then compute a second distance and associate the second distance to the mobile device media access control address and the data packet.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

The specific details of the single embodiment or variety of embodiments described herein are to the described system and methods of use. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the system and method. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The embodiments presented, in general, relate to systems and methods for the localization and identification of mobile devices within an environment. The embodiments may be particularly useful in environments wherein a GPS is unable to operate or is not able to provide a location with sufficient accuracy.

As used herein, the term "environment" may include any region wherein a user transports a mobile device. The environment may be an indoor environment such as a shopping mall wherein a plurality of access points are disposed to identify the mobile device and determine the location of the mobile device. An outdoor environment may include regions such as a parking garage wherein GPS systems are ineffective at determining the location of the mobile device.

Some embodiments disclosed herein significantly improve the ability to monitor the location of a mobile device in an environment and transmit device identifying information, data packets, and device location to a server and associated database. Businesses or other organizations associated with the environment may utilize the data to determine user interactions or events within the environment.

Figure 1:
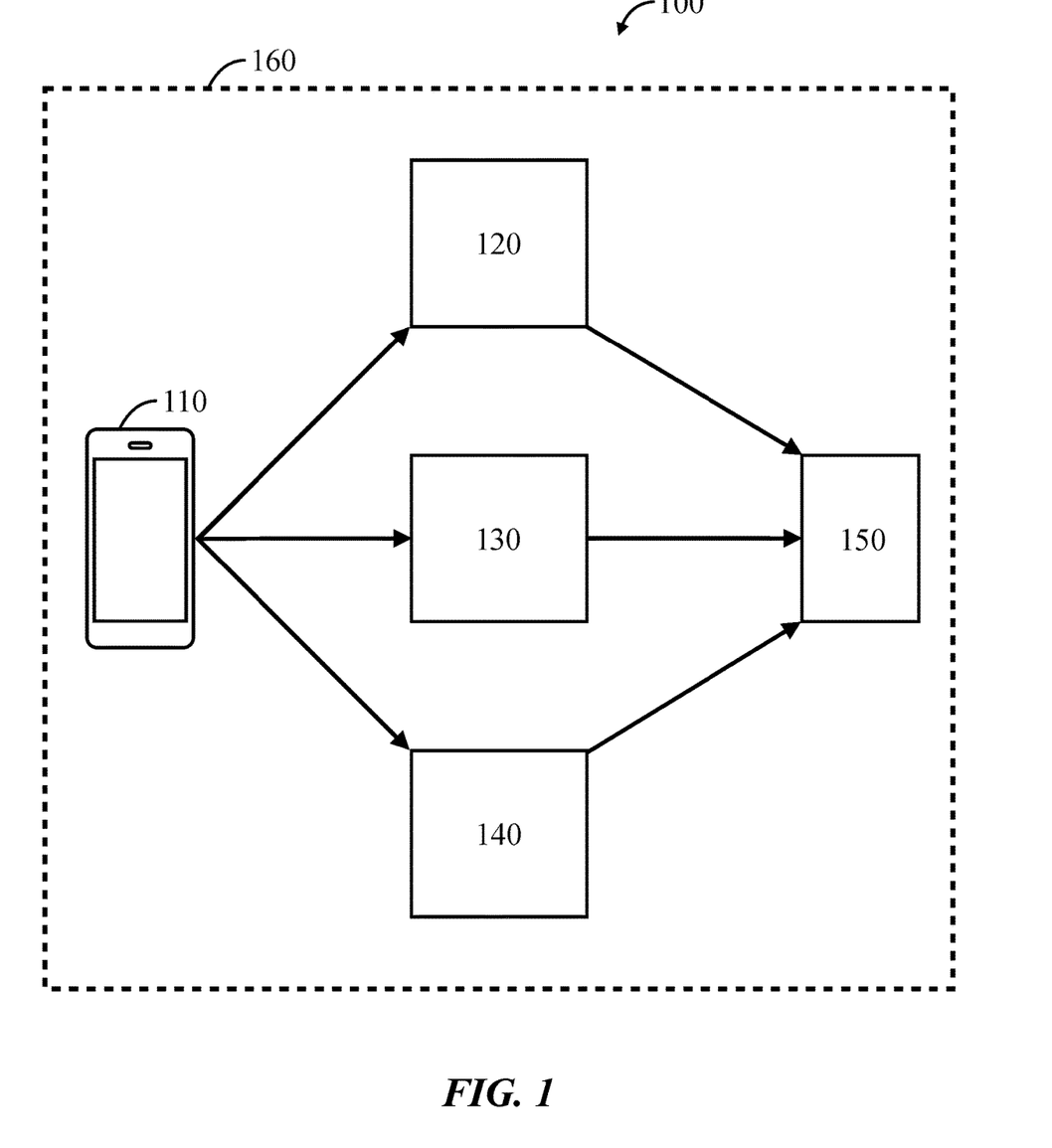
FIG. 1 illustrates a block diagram of the system for determining a mobile device identity and location, according to some embodiments.

FIG. 1 illustrates a schematic of the system 100 according to an exemplary embodiment. A mobile device 110 enters an environment wherein it is detected by a plurality of access points 120, 130, 140 (also referred to herein as a first access point 120, second access point 130, and third access point 140. Each access point is utilized to determine a distance between the mobile device 110 and the access point by measuring a radio-frequency signal strength received from the mobile device 110. A server 150 is in operable communication with each access point 120, 130, 140 via a wireless network 160, such as a WLAN network. One skilled in the arts will understand that the WLAN may include a host WLAN system, which may be an existing enterprise system or otherwise implemented in an enterprise, such as a retail store, building, workgroup, area or other environments via a wireless access point (AP) of the host WLAN.

In some embodiments, each access point is capable of determining a signal strength, a transmission time, and a media access control (MAC) address of one or more mobile devices positioned within a threshold range distance within the environment. Signal strength may be determined by each access point determining a received signal strength indication (RSSI) value from one or more mobile devices in the environment.

In some embodiments, each access point receives a data packet from each mobile device in the environment. The data packet is comprised of an RSSI value, a MAC address, and a data packet reception time stamp. The data packet may then be transmitted to the server.

Figure 2:
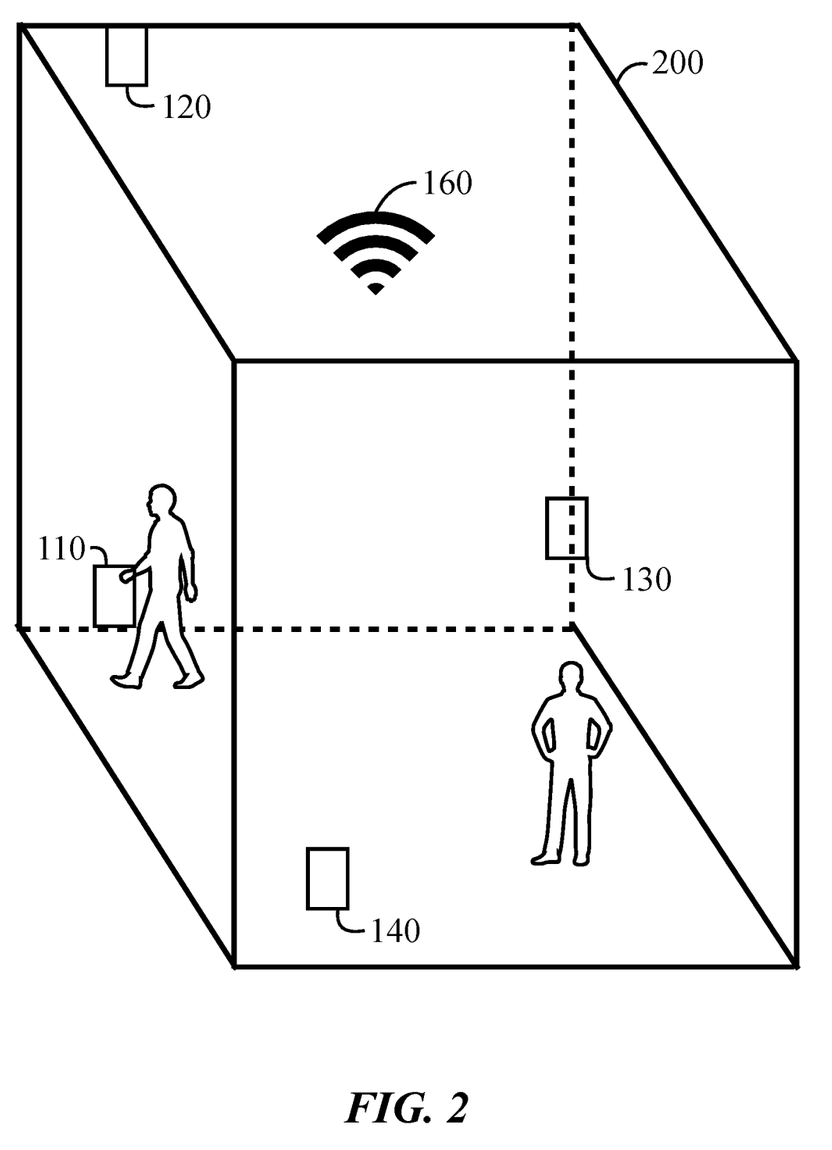
FIG. 2 illustrates a schematic of the environment with deployed access points, according to some embodiments.

FIG. 2 illustrates an exemplary environment 200 having access points 120, 130, 140 deployed therein. Each access point 120, 130, 140 may be static or dynamically positioned in the environment. In an embodiment wherein static positioning is utilized, the access points 120, 130, 140 are positioned to monitor at least a portion of the environment to detect mobile devices 110 therein. Each access point 120, 130, 140 is in operable communication with the wireless network 160 to send and receive information to and from the server.

In some embodiments, the access points 120, 130, 140 are positioned on a dynamic device such that each access point 120, 130, 140 may move throughout the environment 200. Dynamic devices may include drones or autonomous or human operated vehicles.

At least three of the access points are contemplated as detecting any particular mobile device in range for purposes of trilateration in the embodiments to locate the detected mobile device. Fewer than three sensors are contemplated as detecting any particular mobile device in range for purposes of proximity sensing (but not location by trilateration) in some embodiments. Any number of mobile devices may be within a range of any one or more access points.

Figure 3:
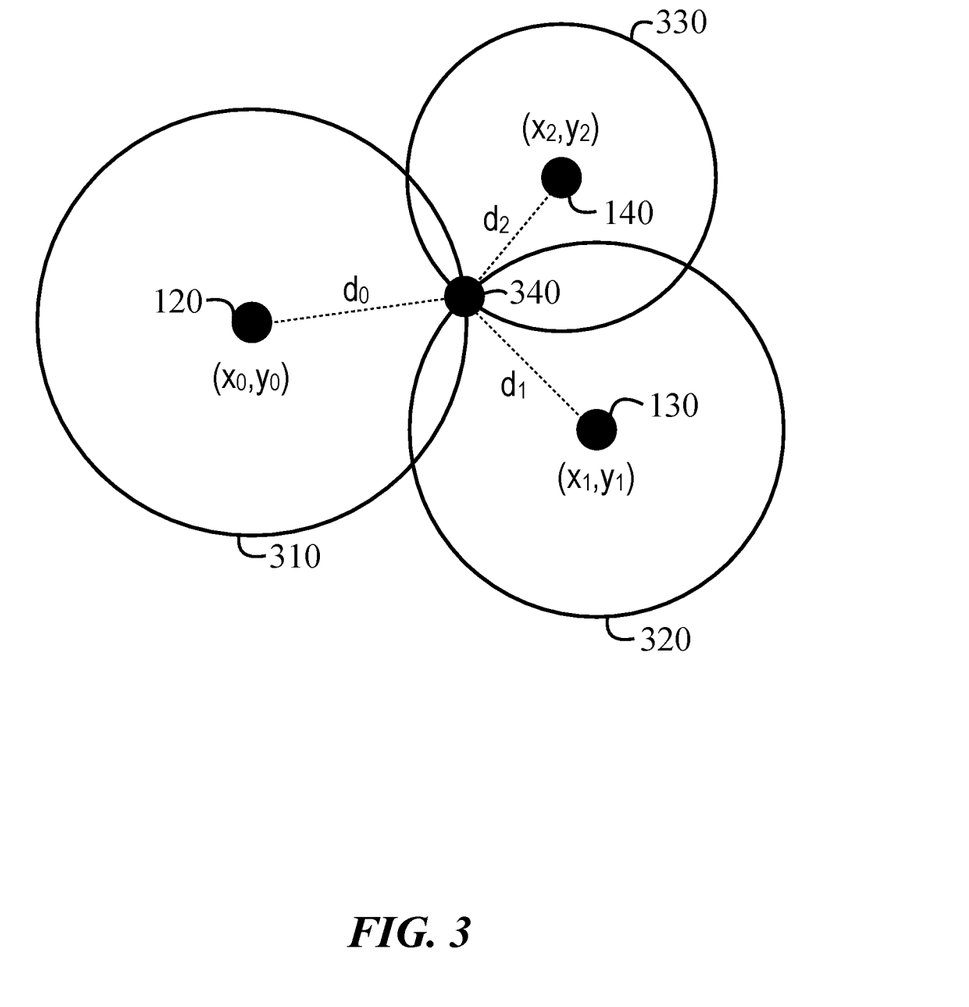
FIG. 3 illustrates a schematic of the trilateration system, according to some embodiments.

FIG. 3 illustrates a schematic of the trilateration positioning system. Each access point 120, 130, 140 monitors a communicable range (310, 320, 330 respectively) to detect data packages presented by mobile devices in the environment. Each data package is comprised of an RSSI value which is converted to a first distance value ($d_0$, $d_1$, $d_2$ respectively). Trilateration may result in errors between the mobile device location 340 and the access points 120, 130, 140 due to various factors which may affect the RSSI value including reflections and obstructions. Equation 1 below is used by a trilateration engine to determine the mobile device location 340. With respect to Equation 1, cartesian coordinates (e.g., x0, y0) are coordinates in a cartesian plane to indicate a location of the device while d is the determined distance between the device and each access point.

$$(x-x_0)^2+(y-y_0)^2+(z-z_0)^2=d_0 \qquad \text{Equation 1}$$

$$(x-x_1)^2+(y-y_1)^2+(z-z_1)^2=d_1$$

$$(x-x_2)^2+(y-y_2)^2+(z-z_2)^2=d_2$$

Figure 4:
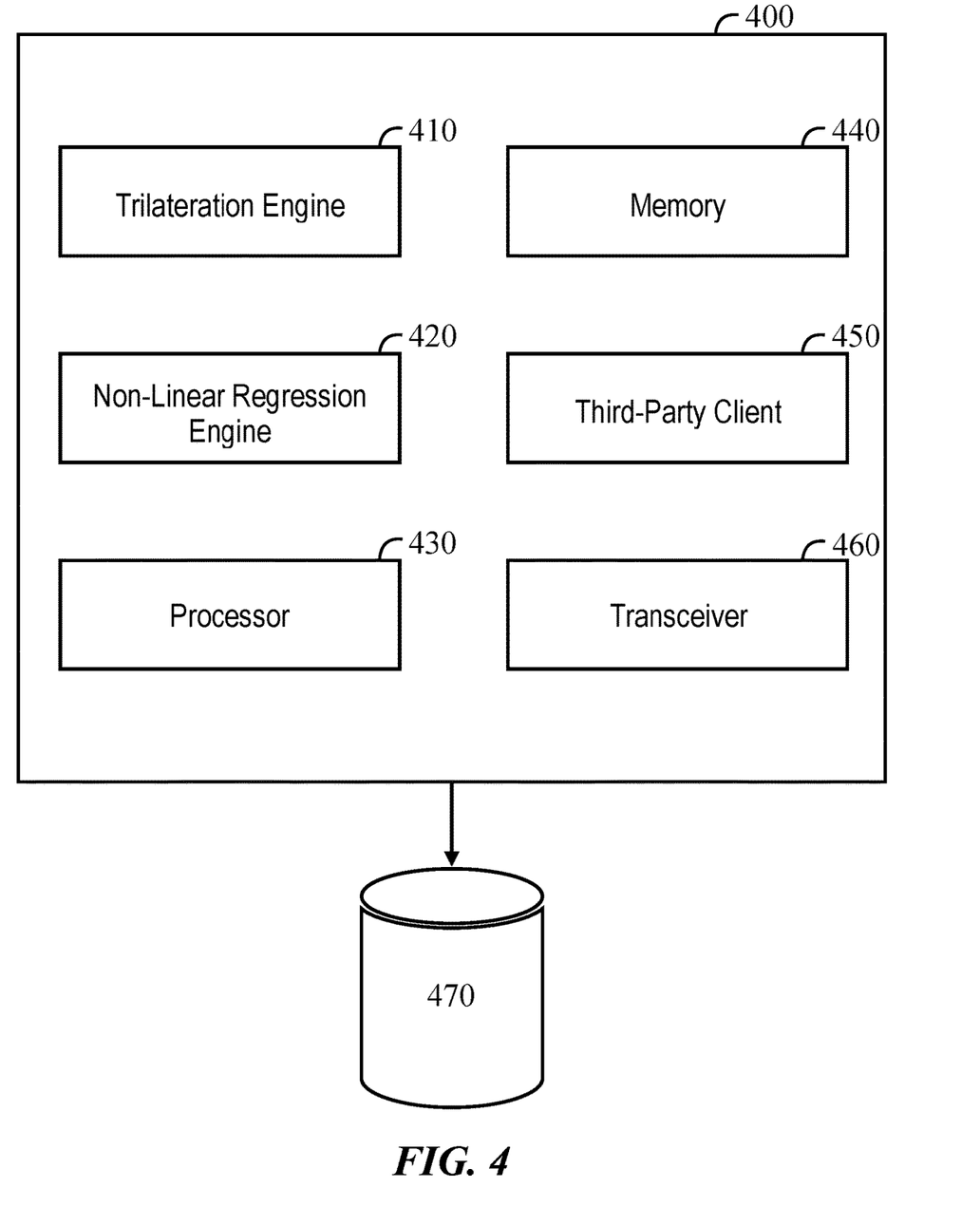
FIG. 4 illustrates a block diagram of the server engine components, according to some embodiments.

FIG. 4 illustrates a block diagram of the server engine 400. The trilateration engine 410 receives the data packet including the RSSI value from the mobile device. The RSSI value is used to determine a first distance between each access point and the mobile device. Equation 1 above is implemented by the trilateration engine 410 to determine the first distance which is transmitted to the non-linear regression engine 420. The non-linear regression engine 420 implements a non-linear least squares fitting equation, Equation 2 below, which minimizes the sum of the squares of the errors found in Equation 1 and results in a mobile device location 340 (shown in FIG. 3). Regarding Equation 2 below, N is the number of access points that detect a device in the environment. Further, $x_i$, $y_i$, and $z_4$ are the coordinates of the access point, and $d_i$ is the distance between the mobile device and the access point. The trilateration engine 410 and non-linear regression engine 420 may be operable by processor 430. Memory 440 may store data packet values received from each mobile device. One skilled in the arts will understand that the memory 440 may be used to store a variety of information related to the embodiments described herein including third-party client 450 information, data related to associated mobile applications, user data, mobile device data, and likewise information. A transceiver 460 may provide communication means between the system and a remote database 470.

$$\sum_{i=0}^{n-1} [(x_i - x)^2 + (y_i - y)^2 + (z - z_i)^2 - d_i^2]^2 \quad \text{Equation 2}$$

Figure 5:
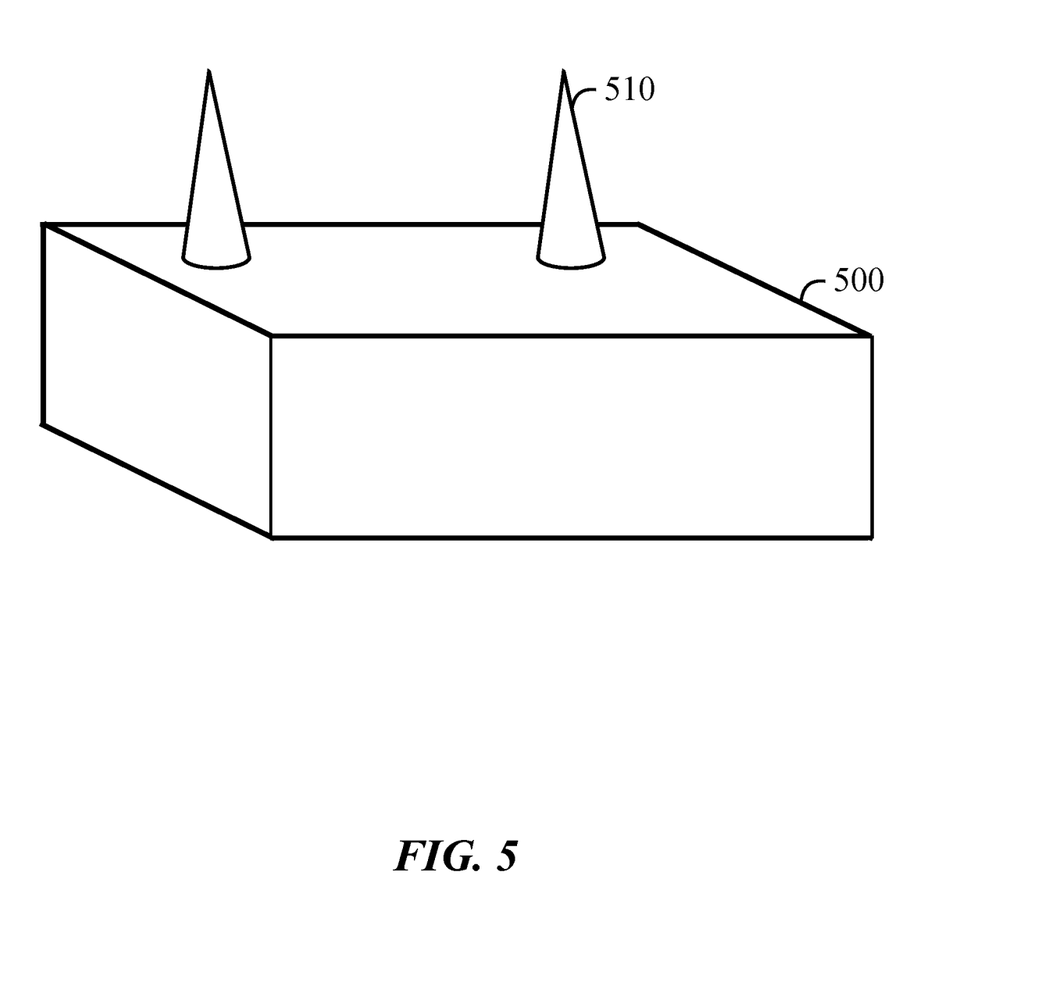
FIG. 5 illustrates a schematic of the access point, according to some embodiments.

FIG. 5 illustrates an exemplary access point housing 500 having an omnidirectional antenna 510 to detect a mobile device in an environment. Access points are deployed in an environment to suitably monitor a substantial portion of the environment for mobile devices. In some embodiments, each access point is operable to run a client that captures 802.11 frames through an interface while operating in a monitoring mode. The access point may then transmit the frames to the server for processing. The server is provided the location of each access point within the environment. Location of the access point may be pre-determined or transmitted in real-time in the embodiments wherein the access point is dynamically positioned. In some embodiments, each access point may be provided with a detection module to detect the presence of a mobile device within the environment and a transceiver to transmit data to the server.

Figure 6:
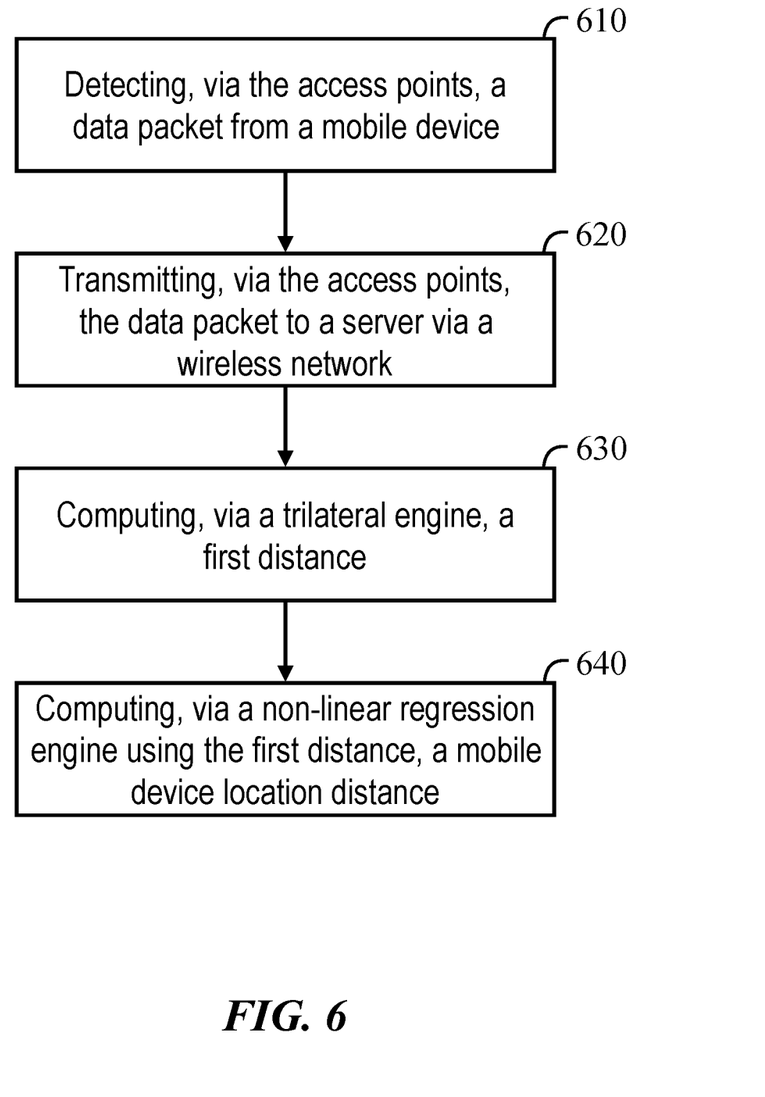
FIG. 6 illustrates a flowchart of a method of utilizing the medical device inventory management system, according to some embodiments.

FIG. 6 illustrates a flowchart for a method for determining the location of a mobile device within an environment having a plurality of access points disposed of therein. In step 610, the access points detect the mobile device and receive a data packet. The data packet may include the RSSI value, MAC address, and a detection time stamp which are transmitted to the server via the wireless network in step 620. In step 630, a trilateral engine computes a first distance between the mobile device and each access point. In step 640, the first distance is transmitted to the non-linear regression engine to account for errors in first distance. The non-linear regression engine then determines the mobile device located within the environment.

By way of example, a mobile device may be implemented as any of the systems described herein and embodied in a personal computing device, a tablet computing device, and/or a mobile computing device (e.g., a smartphone). Any of these aspects of the systems described herein may obtain content from the external data provider.

In various embodiments, the types of networks used for communication between the computing devices that make up the present invention include, but are not limited to, an internet, an intranet, wide area networks (WAN), local area networks (LAN), virtual private networks (VPN), GPS devices, SONAR devices, cellular networks, and additional satellite-based data providers such as the Iridium satellite constellation which provides voice and data coverage to satellite phones, pagers and integrated transceivers, etc. According to aspects of the present disclosure, the networks may include an enterprise network and a network through which a client computing device may access an enterprise network. According to additional aspects, a client network is a separate network accessing an enterprise network through externally available entry points, such as a gateway, a remote access protocol, or a public or private Internet address.

Additionally, the logical operations may be implemented as algorithms in software, firmware, analog/digital circuitry, and/or any combination thereof, without deviating from the scope of the present disclosure. The software, firmware, or similar sequence of computer instructions may be encoded and stored upon a computer readable storage medium. The software, firmware, or similar sequence of computer instructions may also be encoded within a carrier-wave signal for transmission between computing devices.

Content and/or data interacted with, requested, or edited in association with one or more computing devices may be stored in different communication channels or other storage types. For example, data may be stored using a directory service, or a web portal. A computing device may provide a request to a cloud/network, which is then processed by a server in communication with an external data provider. By way of example, a client computing device may be implemented as any of the systems described herein and embodied in a personal computing device, a tablet computing device, and/or a mobile computing device (e.g., a smartphone). Any of these aspects of the systems described herein may obtain content from the external data provider.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A system for locating and identifying a mobile device in an environment, the system comprising:
   a plurality of access devices disposed in the environment, each of the plurality of access devices detecting a signal strength of the mobile device in relation respectively to each of the plurality of access devices, each said access device determining a media access control address to identify the mobile device;
   a server in operable communication with each of the plurality of access devices,
   the server receiving the signal strength from each of the plurality of access devices,
   the server providing the signal strength from each of the plurality of access devices to a trilateration processor to calculate a first distance respectively between each of the plurality of access devices and the mobile device;

the trilateration processor transmitting the respective first distance between each of the plurality of access devices and the mobile device to a non-linear regression processor;

the non-linear regression processor using the first distance to compute respectively a second distance between each of the plurality of access devices and the mobile device; and the non-linear regression processor using the second distance between each of the plurality of access devices and the mobile device to determine a location of the mobile device.

2. The system of claim 1, wherein the plurality of access devices is are comprised of a first access device to detect a first signal strength of the mobile device, a second access device to detect a second signal strength of the mobile device, and a third access device to detect a third signal strength of the mobile device.

3. The system of claim 2, wherein the first signal strength, the second signal strength, and the third signal strength are transmitted to the server.

4. The system of claim 1, wherein the server determines the media access control address of the mobile device.

5. The system of claim 1, further comprising a wireless internet network, wherein the mobile device has enabled a wireless internet connection.

6. The system of claim 5, wherein the mobile device transmits a data packet to the server via the wireless network, and wherein the data packet is associated with the media access control address.

7. The system of claim 6, wherein the server collates the media access control address, and the data packet of the mobile device and stores the collated data in a database.

8. A system for locating and identifying a mobile device in an environment, the system comprising:

a plurality of access devices disposed in the environment, each access device of the plurality of access devices detecting a signal strength of a mobile device, each said access device determining a media access control address to identify the mobile device, and each said access device transmitting the signal strength and the media access control address of the mobile device to a server;

the server providing the signal strength and the media access control address to a trilateration processor to compute a distance respectively between each of the plurality of access devices and the mobile device;

a non-linear regression processor to receive the respective computed distance between each of the plurality of access devices and the mobile device, and to correct the computed distances to find a location for the mobile device; and a wireless network in communication with the plurality of access devices, the mobile device, and the server to associate the location with the media access control address of the mobile device.

9. The system of claim 8, wherein each of the plurality of access devices is statically positioned in the environment.

10. The system of claim 8, wherein each of the plurality of access devices is dynamically positioned in the environment.

11. The system of claim 8, wherein the plurality of access devices are comprised of a first access device to detect a first signal strength of the mobile device, a second access device to detect a second signal strength of the mobile device, and a third access device to detect a third signal strength of the mobile device.

12. The system of claim 11, wherein the first signal strength, the second signal strength, and the third signal strength are transmitted to the server.

13. The system of claim 8, wherein the server distributes information to the mobile device via the wireless network, and wherein the information is associated with an event corresponding to the environment.

14. The system of claim 8, wherein the server processes a user event within the environment.

15. A method for locating and identifying a mobile device in an environment, the method comprising the steps of:

detecting, via at least three access points, a signal strength, a media access control address, and a data packet corresponding to the mobile device in the environment;

transmitting, via the at least three access points, the signal strength, the media access control address, and the data packet to a server via a wireless network;

computing, via a trilateration processor in operable communication with the server, a first distance between the at least three access points and the mobile device;

transmitting the first distance to a non-linear regression processor in operable communication with the server; and computing, via the non-linear regression processor, a second distance between the at least three access points and the mobile device, and associating the second distance to the mobile device media access control address and the data packet.

* * * * *